UNITED STATES PATENT OFFICE.

JOHN PICKLES, OF WIGAN, ENGLAND, ASSIGNOR TO JAMES S. STURGIS AND THOMAS KEECH, OF NEW YORK CITY.

IMPROVEMENT IN THE MANUFACTURE OF PAPER STOCK FROM CERTAIN PLANTS.

Specification forming part of Letters Patent No. 91,480, dated June 15, 1869; reissue No. 4,524, dated August 22, 1871.

*To all whom it may concern:*

Be it known that I, JOHN PICKLES, of Wigan, in the county of Lancaster, England, in the Kingdom of Great Britain and Ireland, engineer, have invented a new and useful composition of matter obtained from the wild and cultivated rice-plant for the manufacture of paper or paper stock; and I do hereby declare the following to be a full, clear, and exact description thereof.

The nature of my invention consists in making stock for the manufacture of paper from the fibers obtained from the leaves, stocks, and roots of the wild and cultivated rice plant, a cereal grass known by the botanical name "oryza," and in the use and application of said plant to the said manufacture.

The plant may be cut into short lengths or otherwise broken up, or may be placed whole in an open or closed boiler or vessel of any convenient description. After the boiler is charged with the plant I then introduce into the boiler or vessel a sufficient quantity of lime-water, milk of lime, or alkali, to cover the plant under treatment. The strength of the liquor must be regulated in accordance with the nature of the plant under treatment, or the amount of silex and glutinous matter contained in the same. This varies, according to the soil or bottom upon which the plant grows. Either fire or steam heat is then applied to the vessel for a length of time, varying from about three to five hours, at the end of which time it will be found that the plant has been reduced to a pulpy consistency. When this is effected the plant may be removed from the boiler or vessel. After the plant is reduced to a pulp it is placed in an ordinary washing-vat and cleansed of the dirt and alkali contained therein. After being thus properly washed and freed from water by draining or otherwise it may be then bleached by any of the ordinary processes now in use for bleaching paper stock, and is then ready for manufacture into paper.

The above process can be carried on at any temperature required for the operation in progress, whether the temperature of the atmosphere, of water at the boiling-point, or any degree.

I no not confine myself to the use of a caustic alkaline solution or liquor in the reduction of this plant to a pulp, for I have found the plant to vary in the amount of silex or gluten it contains, depending upon the circumstances heretofore recited. For the caustic alkali may be substituted soda-ash, milk of lime or a lime solution, or other alkaline salts, either alone or in combination.

When but small quantity of silex or gluten is found in the plant it may be treated in a paper-maker's beating or washing-engine. When thus treated a caustic alkaline liquor is placed with the plant and the whole boiled with ordinary or superheated steam for about eight hours, and then the beating-engine put in motion. The pulp may also be washed by the beating-engine.

The plant may be reduced to pulp in an open vessel or boiler having such mechanical arrangement, by means of tubes therein, as will give effect to laws of gravitation, in obedience to which heated liquid has the tendency to ascend. This vessel should be provided with a grating or perforated plates at a suitable distance from the bottom. The plant being placed in the vessel, caustic alkaline liquor is then introduced, which, in consequence of its greater specific gravity, descends to the space between the grating and the bottom of the vessel. Heat is then applied and the heated portions of the liquid rise through the pipes provided for the purpose above the stock or plant, and then cooling, descend through the same to the pan at the bottom of the vessel. Thus a current of alkaline liquor is kept passing through the stock, and in the requisite time it is reduced to a pulp ready for further treatment.

What I claim as my invention, and desire to secure by Letters Patent, is—

The manufacture of paper pulp from material or article, substantially as herein described.

Witnesses: JOHN PICKLES.

HENRY WOOD,
JAMES FOLEY.